United States Patent
Nakashima et al.

(10) Patent No.: US 12,225,167 B2
(45) Date of Patent: Feb. 11, 2025

(54) READING APPARATUS WITH OPERATION PANEL CONFIGURED TO REDUCE INTERFERENCE WITH HANDLING OF ORIGINAL DOCUMENTS

(71) Applicant: CANON KABUSHIKI KAISHA, Tokyo (JP)

(72) Inventors: Akira Nakashima, Kanagawa (JP); Toru Yada, Kanagawa (JP); Mitsuyuki Fujibayashi, Kanagawa (JP); Gakushi Tanaka, Kanagawa (JP); Yuji Kagami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 209 days.

(21) Appl. No.: 17/665,312

(22) Filed: Feb. 4, 2022

(65) Prior Publication Data
US 2022/0263960 A1 Aug. 18, 2022

(30) Foreign Application Priority Data
Feb. 17, 2021 (JP) .................. 2021-023592

(51) Int. Cl.
 *H04N 1/21* (2006.01)
 *H04N 1/00* (2006.01)
 *H04N 1/10* (2006.01)
(52) U.S. Cl.
 CPC ....... *H04N 1/00551* (2013.01); *H04N 1/1013* (2013.01)
(58) Field of Classification Search
 None
 See application file for complete search history.

(56) References Cited

U.S. PATENT DOCUMENTS

| | | | |
|---|---|---|---|
| 10,958,806 B2 | 3/2021 | Ishihara et al. | H04N 1/1039 |
| 11,006,010 B2 | 5/2021 | Ota et al. | B41J 29/393 |
| 11,124,004 B2 | 9/2021 | Umehara et al. | B41J 29/38 |
| 2007/0069451 A1* | 3/2007 | Iwago | H04N 1/00572 271/186 |

(Continued)

FOREIGN PATENT DOCUMENTS

JP  2018-047670  3/2018

OTHER PUBLICATIONS

U.S. Appl. No. 17/496,565, filed Oct. 7, 2021.
U.S. Appl. No. 17/670,068, filed Feb. 11, 2022.
U.S. Appl. No. 17/670,109, filed Feb. 11, 2022.

*Primary Examiner* — Dung D Tran
(74) *Attorney, Agent, or Firm* — Venable LLP

(57) ABSTRACT

A reading apparatus includes a main body that includes an original document plate and a reading portion configured to read an image from the original document, and an operation portion that is attached in the original document plate. The operation portion includes: a front face casing portion; and a rear face casing portion that is engaged with the front face casing portion at an operation surface. An upper end portion of the operation portion is as high as the original document plate or higher than the original document plate, and in an engaging portion of the front face casing portion and the rear face casing portion at the upper end portion, an upper edge of the front face casing portion has a shorter distance to the lower end portion of the operation portion than the upper edge of the rear face casing portion.

12 Claims, 17 Drawing Sheets

(56) References Cited

U.S. PATENT DOCUMENTS

| | | | | |
|---|---|---|---|---|
| 2008/0123131 A1* | 5/2008 | Sawada | .............. | H04N 1/00493 |
| | | | | 358/1.15 |
| 2013/0077114 A1* | 3/2013 | Short | ................. | G03G 15/6552 |
| | | | | 358/1.13 |
| 2013/0155450 A1* | 6/2013 | Higashikawa | ......... | B41J 2/1752 |
| | | | | 358/1.15 |
| 2017/0180578 A1* | 6/2017 | Nimura | .............. | H04N 1/00687 |
| 2018/0027134 A1* | 1/2018 | Sugawara | .......... | H04N 1/00559 |
| | | | | 358/1.12 |

* cited by examiner

ENLARGED VIEW
OF XXX PORTION

READING APPARATUS WITH OPERATION PANEL CONFIGURED TO REDUCE INTERFERENCE WITH HANDLING OF ORIGINAL DOCUMENTS

BACKGROUND OF THE INVENTION

Field of the Invention

The present invention relates to a reading apparatus constituted of a reading portion that reads an image from an original document, a recording portion that records the image on a recording material, and an operation portion that operates the reading portion and the recording portion.

Description of the Related Art

In a recording device such as a copier, constituted of a reading portion that reads an image from an original document and a recording portion that records the image on a recording material, a configuration having an operation portion to operate the device disposed in an upper portion of the device main body is known. If this operation portion is configured to be rotatable, visibility and operability can be improved regardless the posture and height of a user, but in this case, depending on the position and configuration of the operating portion, removal of the original document may become difficult, which may cause scratching and bending of the original document. In order to make removal of the original document easier, a configuration, where the upper end portion of an operation panel moves to a position lower than the original document plate once opening of an original document cover of the reading portion is detected, is proposed (Japanese Patent Application Publication No. 2018-47670).

SUMMARY OF THE INVENTION

However, in the case of the configuration disclosed in Japanese Patent Application Publication No. 2018-47670, the detection unit to detect that the original document cover is open, the drive portion to move the operation panel so that the upper end portion of the operation panel becomes lower than the original document plate, and the like, are required, which increases cost.

It is an object of the present invention to provide a technique to remove the original document more easily by a simple and low cost configuration.

To solve this above problem, a reading apparatus of the present invention includes:
  a main body that includes an original document plate on which an original document is placed, and a reading portion configured to read an image from the original document placed on the original document plate; and
  an operation portion that is attached in front of the original document plate in the main body,
  wherein the operation portion includes:
  a front face casing portion that is located on an operation surface side; and
  a rear face casing portion that is engaged with the front face casing portion at a rear side of the operation surface, and is supported by the main body,
  wherein an upper end portion of the operation portion is as high as the original document plate or higher than the original document plate,
  wherein in an engaging portion of the front face casing portion and the rear face casing portion at the upper end portion of the operation portion, an upper edge of the front face casing portion has a shorter distance to the lower end portion of the operation portion than the upper edge of the rear face casing portion in a direction from the upper end portion of the operation portion to the lower end portion of the operation portion.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments.

Embodiment 1

A recording apparatus 10 (reading apparatus) according to an embodiment of the present invention is an example of applying the present invention to an inkjet printer that records images by ejecting ink, which is liquid for recording images, onto a recording material (liquid ejection type). A recording apparatus to which the present invention is applicable is not limited to the liquid ejection type image recording apparatus (image forming apparatus), but the present invention may be applied to a casing structure of an electrophotographic type image recording apparatus (laser printer). The meaning of the term "recording" includes not only a case of forming such significant information as text and graphics but also include a case of widely forming images and patterns on a recording medium, or processing the medium, regardless whether the information is significant or not, and it does not matter whether the information to be "recorded" is information that a human can visually recognize or not. In Embodiment 1, it is assumed that the "recording medium" (recording material) is a sheet material (paper), but the "recording medium" may be a cloth, plastic film, or the like.

Figure 1:
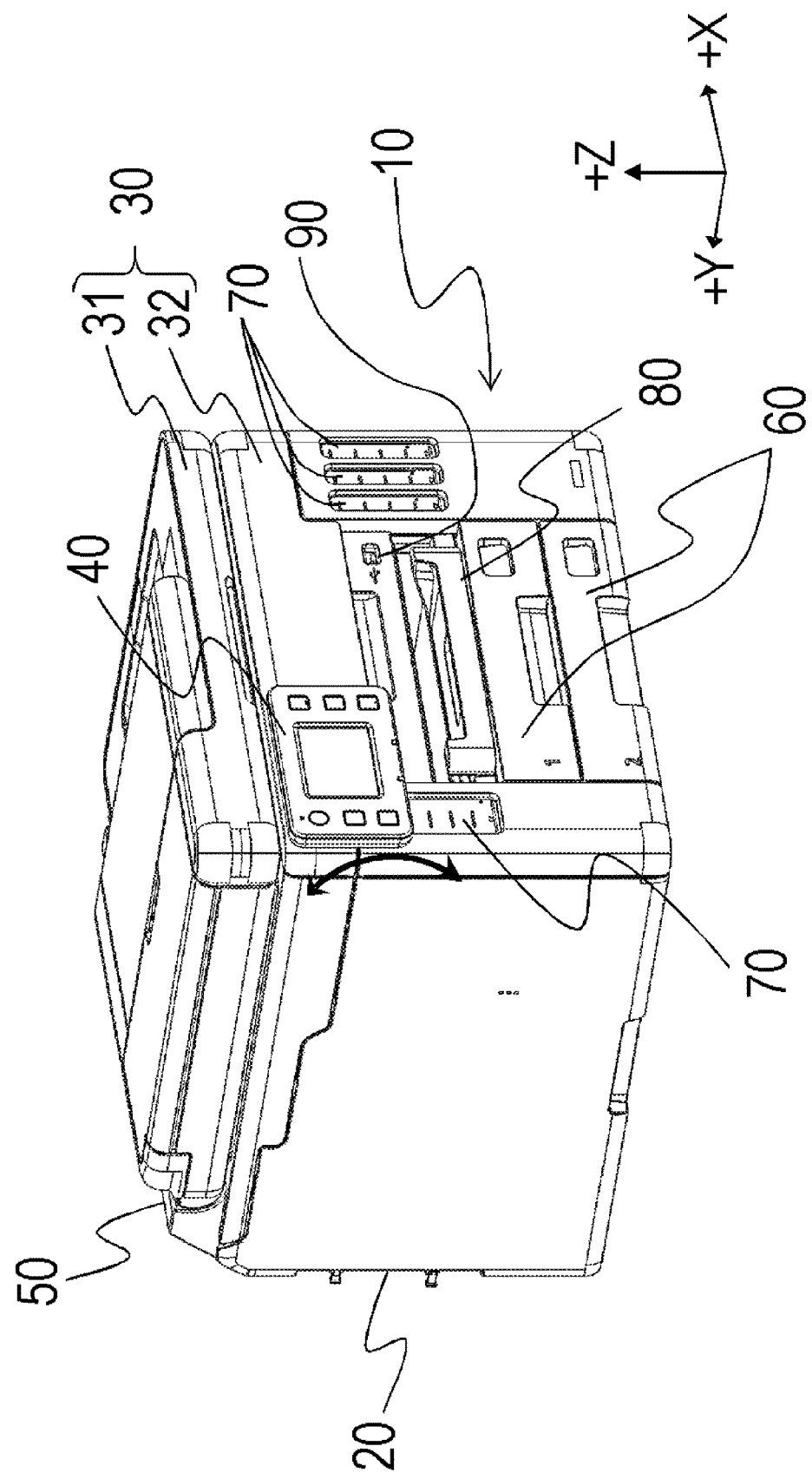
FIG. 1 is a perspective view of a recording apparatus according to Embodiment 1.

FIG. 1 is an external perspective view of the recording apparatus 10 according to Embodiment 1. In the arrow directions indicated in FIG. 1, the width direction of the apparatus is the X direction, the depth direction of the apparatus is the Y direction, and the height direction of the apparatus is the Z direction. In each direction, the left and right are used for the X direction, the front/front face/front end and the back/rear face/rear end are used for the Y direction, and the upper and lower are used for the Z direction, as the arrow marks in FIG. 1 indicate. In some cases, the left direction in the width direction is referred to as a first width direction, and the right direction in the width direction is referred to as a second width direction. Each of these directions is determined based on the installation surface of the recording apparatus 10. For example, in the case of installing the recording apparatus 10 on a horizontal surface, which is a normally assumed installation state, the Z direction (height direction) matches with the vertical direction, and the X and Y directions match with the horizontal direction. The arrow marks X, Y and Z of the other figures are the same. In Embodiment 1 in particular, a sheet conveying direction corresponds to the Y direction, and a carriage scanning direction (a sheet width direction) corresponds to the X direction.

Generally the recording apparatus 10 includes a main body 20, a reading portion 30, an operation portion 40, an automatic sheet feeder (ASF) 50, a cassette 60, an ink tank 70, a paper discharge tray 80, and a control portion (control circuit board disposed inside the main body) which is not illustrated.

A flow of the printing (image recording operation) will be described next. Based on data sent from an external device, such as a personal computer (PC), or an original document read by the reading portion 30, the recording apparatus 10 records the image on a sheet (recording material). The sheet loaded on the automatic sheet feeder (ASF) 50 or on the cassette 60 is fed to a recording portion (not illustrated) included in the main body 20 by a conveying roller (not illustrated). Based on the data sent from a PC, an image read by the reading portion 30, or data read from a later mentioned external storage medium 100 (e.g. USB memory), the recording portion records the image on the sheet using ink that is supplied from the ink tank 70 which stores ink. Specifically, the image is recorded by scanning with a carriage (not illustrated) included in the main body 20. The sheet on which the image is recorded is discharged to the paper discharge tray 80 by a paper roller.

Figure 2:
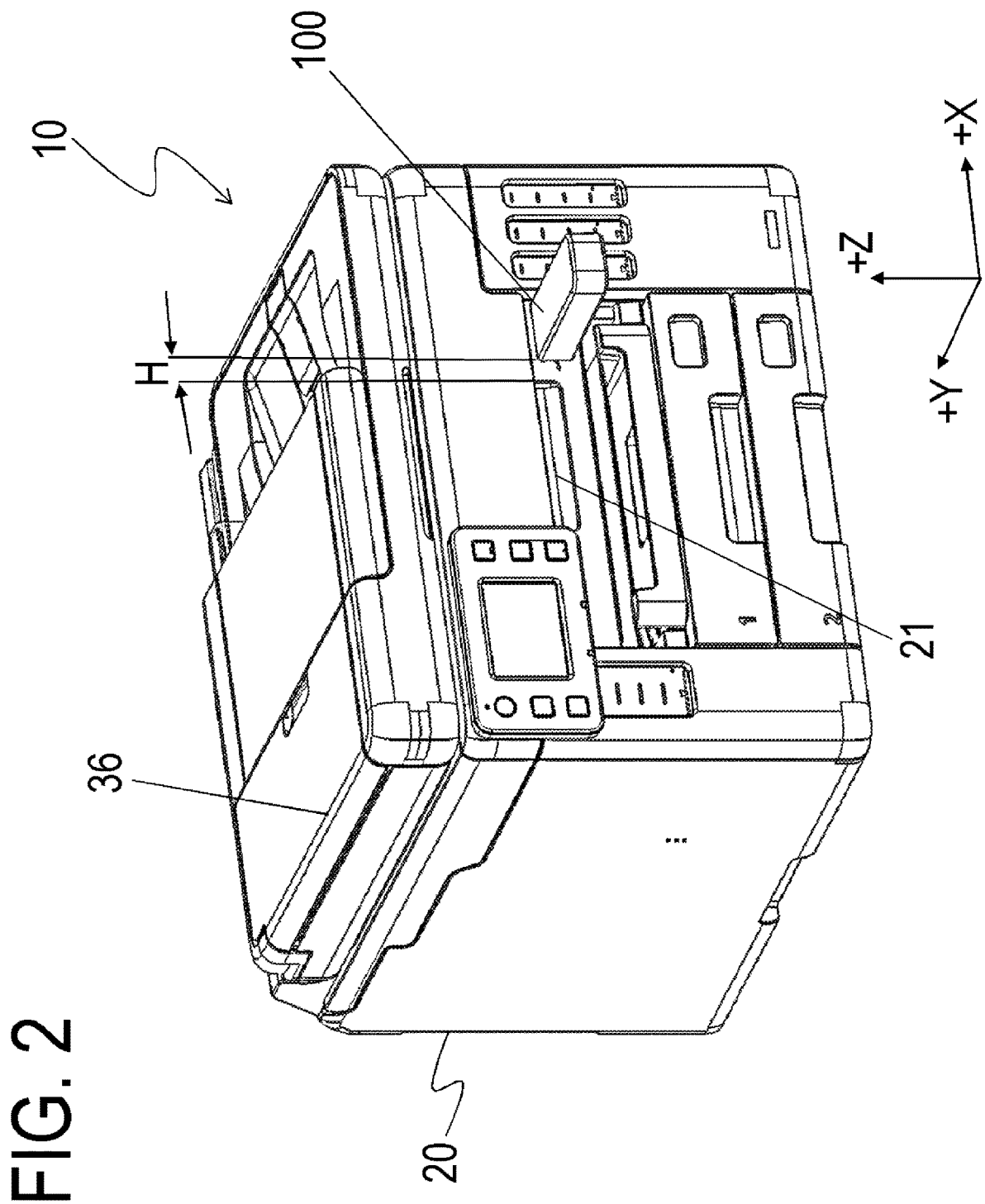
FIG. 2 is a perspective view of the recording apparatus according to Embodiment 1 in which an external recording medium is attached.

FIG. 2 is a perspective view of the recording apparatus 10. A storage medium inserting portion 90 (see FIG. 1) is disposed on the front face of the main body 20. An operator inserts an external storage medium 100 (e.g. USB memory) into the storage medium inserting portion 90 to connect the external storage medium 100 with the main body 20, and allows the recording apparatus 10 to read the data stored in the external storage medium 100, so that this data can be printed.

Figure 3A:
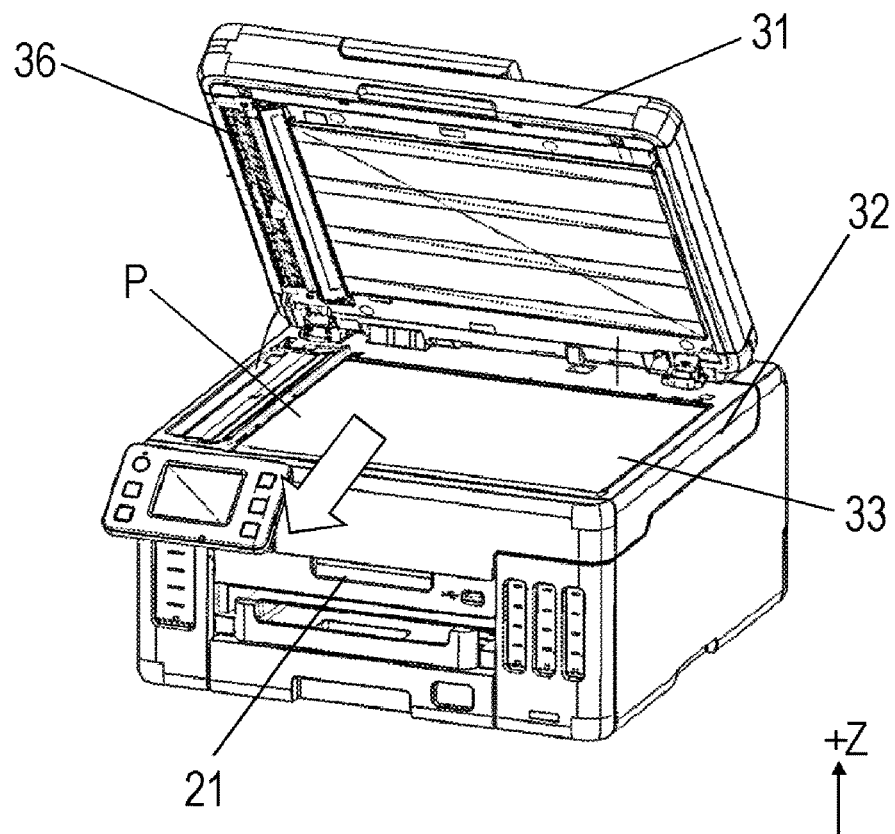
FIGS. 3A and 3B are perspective views of the recording apparatus according to Embodiment 1.

FIG. 3A is a perspective view of the recording apparatus 10 when an original document cover 31 is opened from an original document plate 32 in the reading portion 30. In the reading portion 30, the original document cover 31 is disposed to be openable/closable from the upper face (top face of a transparent member 33) of the original document plate 32. Here the original document cover 31 of Embodiment 1 is equipped with an automatic document feeder (ADF) 36. The automatic document feeder (ADF) 36 allows setting a plurality of original documents and automatically feeding the original documents to the transparent member 33 continuously. The original document cover may be a type that does not include the ADF 36.

In a case of reading an original document P provided by the operator using the reading portion 30 and printing the read data, such as an image, the operator first opens the original document cover 31 and places the original document P on the transparent member (e.g. glass) 33, so as to set the original document P at a predetermined position. Then the operator closes the original document cover 31 and reads an image or the like of the original document P using a reading portion (not illustrated) disposed below the transparent member 33 by a predetermined operation. Once the read data is printed, the operator opens the original document cover 31 again, and pulls out the original document in the arrow direction (−Y direction), and closes the original document cover 31 after the original document is pulled out.

Figure 3B:
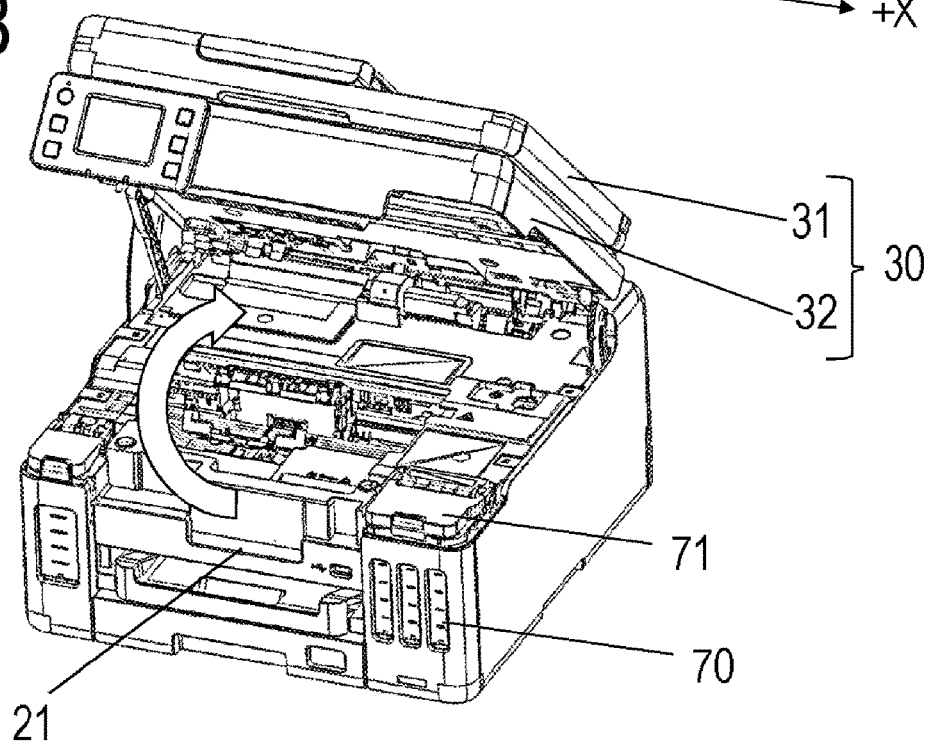

FIG. 3B is a perspective view of the recording apparatus 10 when the reading portion 30 is opened. When the operator inserts their hand (fingers) into a hand grip portion 21 and applies force in the +Z direction, the reading portion 30 opens in the arrow direction indicated in FIG. 3B, and the interior of the main body is exposed. In this state, the operator can open an ink tank cap 71 and replenish ink in the ink tank 70, exchange a recording head (not illustrated), or remove paper jammed in the conveying portion or the like.

Figure 4:
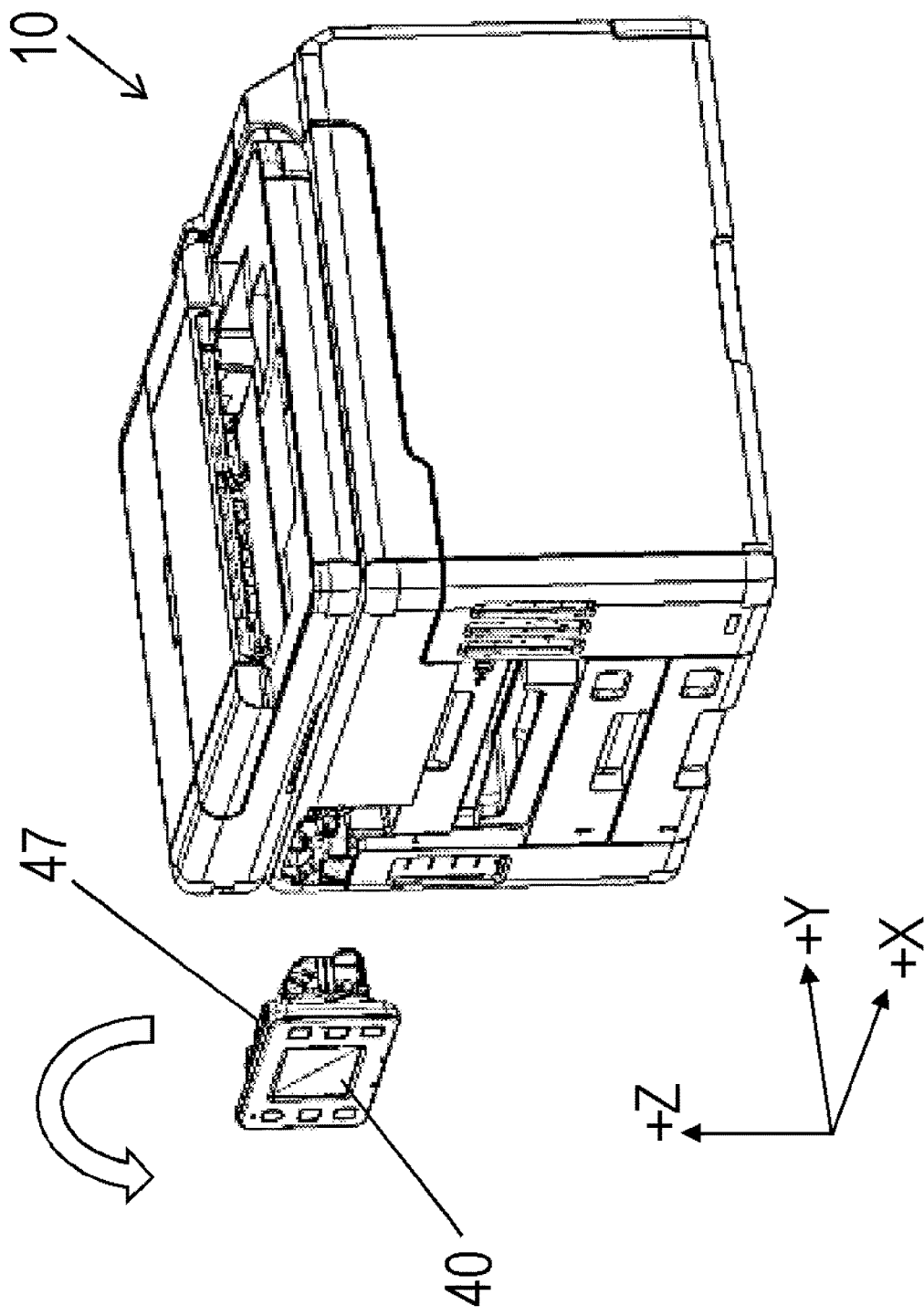
FIG. 4 is a perspective view of the recording apparatus according to Embodiment 1 when an operation portion is removed.
Figure 5:
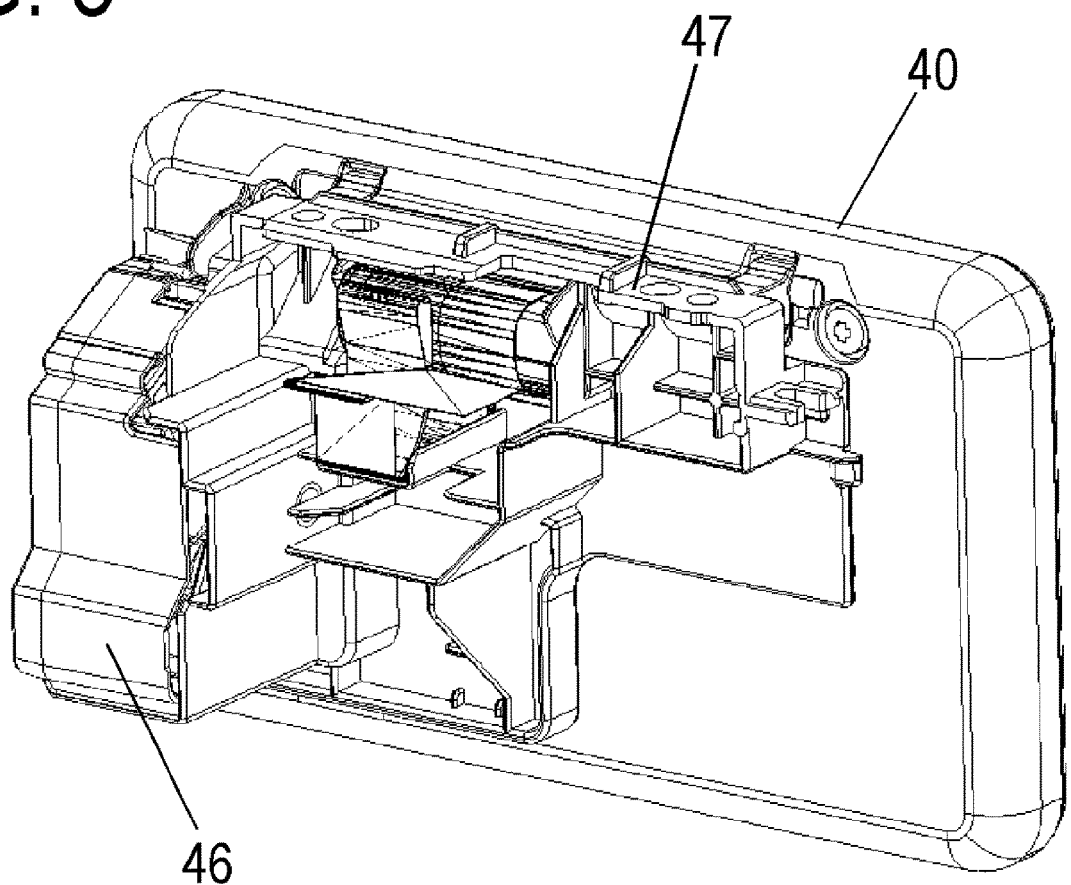
FIG. 5 is a rear perspective view of the operation portion according to Embodiment 1.
Figure 5:
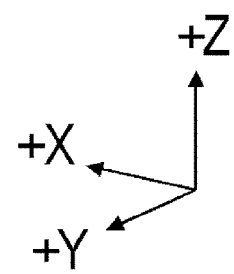

FIG. 4 is a perspective view of the recording apparatus 10 when the operation portion 40 is removed from the main body 20. As described later, the operation portion 40 includes: a display portion (operation surface) to notify various information to the operator; keys to operate various functions; and electronic components (not illustrated). The operation portion 40 also includes: a holding mechanism 48 to rotate the operation portion 40 with respect to the apparatus main body, so that the operation surface of the display portion and the like reach a position (angle) desired by the operator (see FIGS. 6A and 6B); and a panel base 47 to attach the operation portion 40 to a reading base 37 (see FIGS. 15A and 15B).

Figure 8:
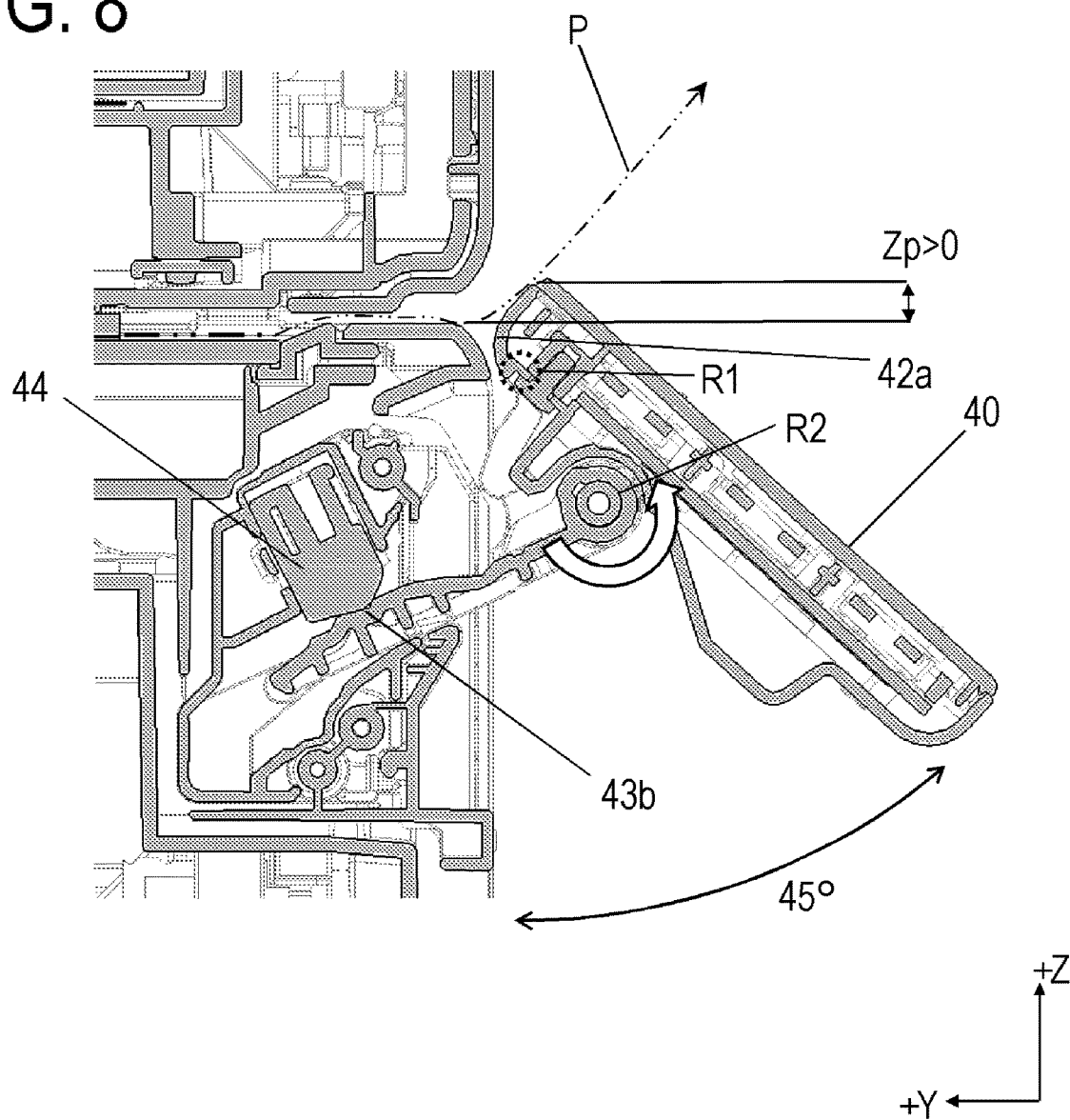
FIG. 8 is a cross-sectional view of a part of the recording apparatus according to Embodiment 1.
Figure 9:
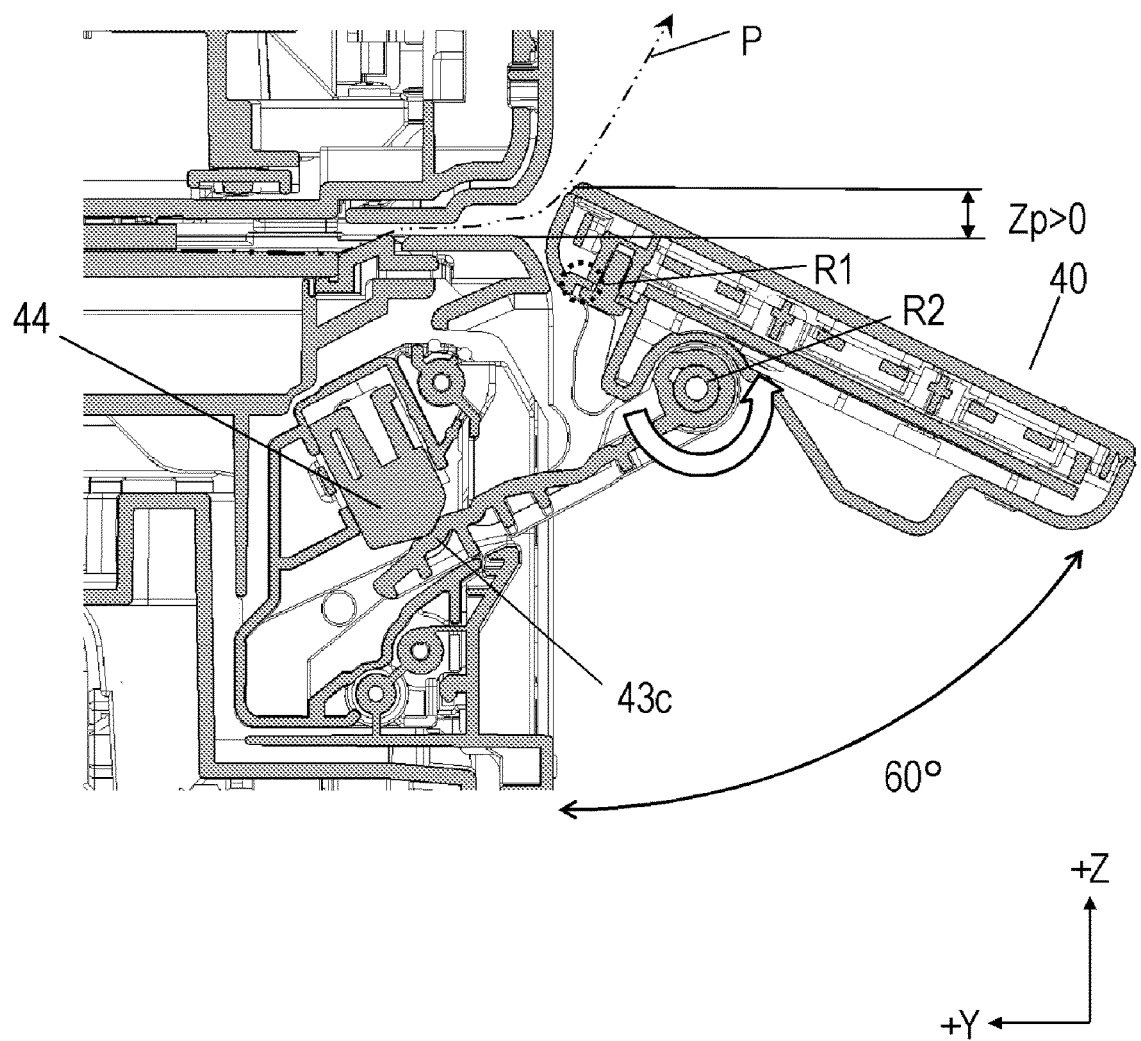
FIG. 9 is a cross-sectional view of a part of the recording apparatus according to Embodiment 1.
Figure 10:
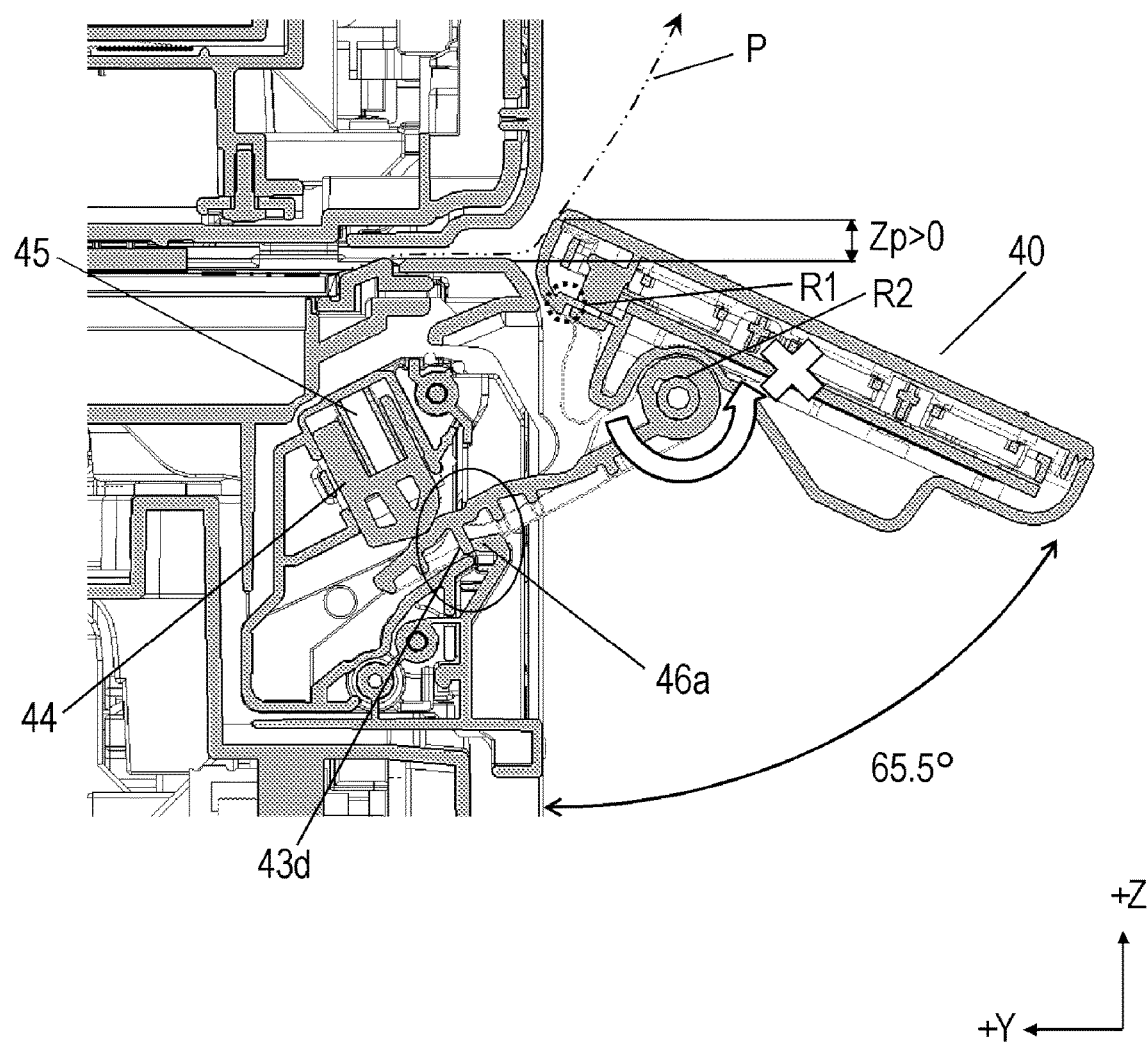
FIG. 10 is a cross-sectional view of a part of the recording apparatus according to Embodiment 1.

As a casing structure, the operation portion 40 includes: a front face casing portion 41 equipped with the operation surface; and a rear face casing portion 42 that is engaged with the front face casing portion 41 on the rear side of the operation surface, and is supported by the apparatus main body. The rear face casing portion 42 is shaft-supported by the apparatus main body, so as to be rotatable around a rotation axis R1 which extends parallel with the operation surface in an approximate horizontal direction. By rotating with respect to the apparatus main body, the operation portion 40 can assume a close posture, where the upper end portion of the operation portion 40 and the lower end portion of the operation portion 40 are vertical and the operation surface faces an approximate horizontal direction (FIGS. 7A and 7B); and an open posture, where the lower end portion of the operation portion 40 protrudes toward the upper front side compared with the close posture and the operation surface is tilted upward (FIGS. 8 to 10).

As illustrated in FIG. 1, the operation portion 40 is located in front of the original document plate 32 in the Y direction, where at least a part of the operation portion 40 overlaps with the original document plate 32 in the width direction (X direction), and the upper end portion of the operation portion 40 is disposed at a posture that is approximately the same as or higher than the level of the top face of the original document plate 32.

Figure 6A:
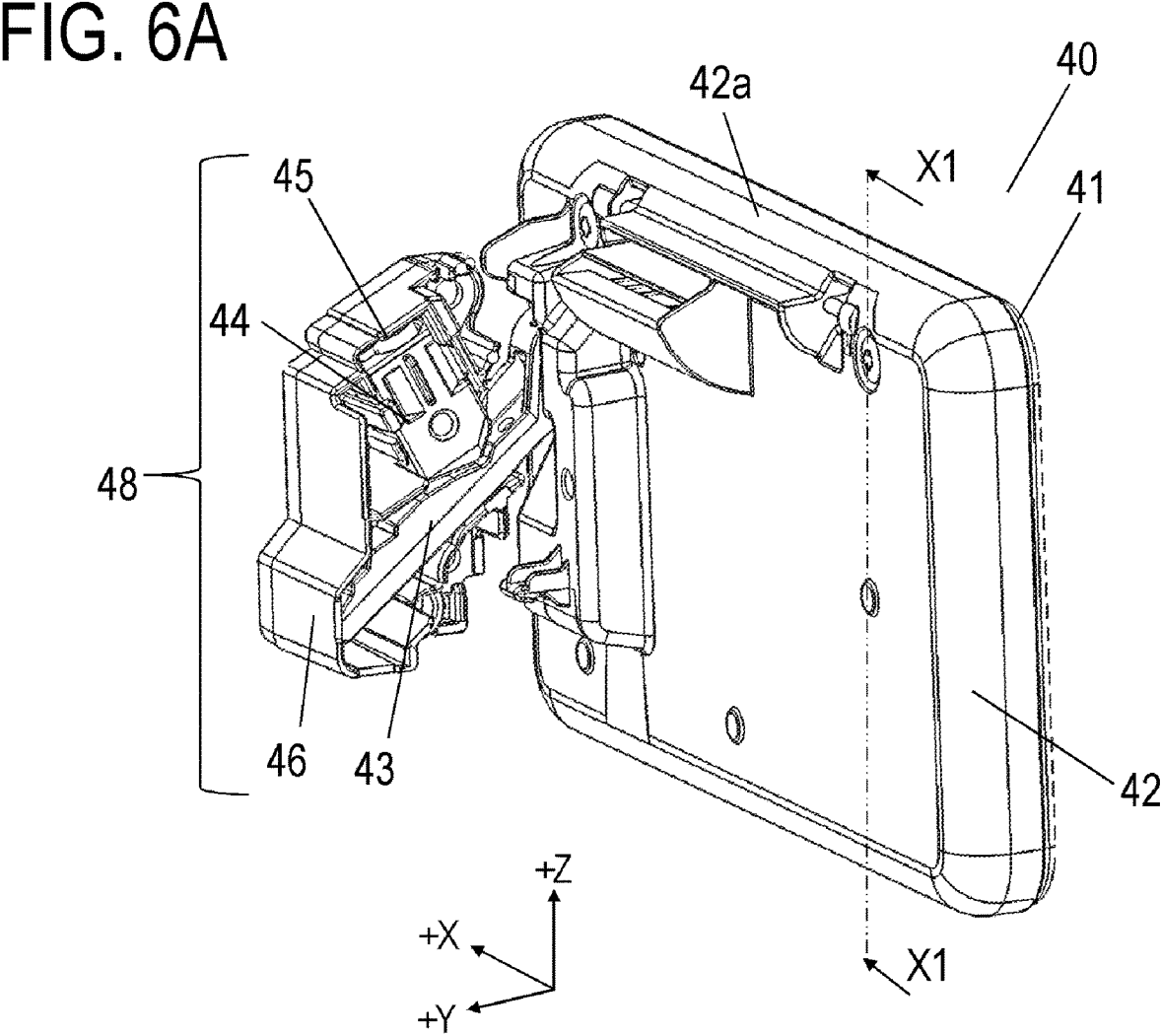
FIGS. 6A and 6B are diagrams depicting a configuration of the operation portion according to Embodiment 1.

FIG. 6A is a rear perspective view of a part of the operation portion 40 for describing a holding mechanism 48. On the rear face casing portion 42, the holding mechanism 48, which rotates the operation portion 40 and holds the operation portion 40 at a predetermined angle, is attached. The holding mechanism 48 is constituted of an operation portion stay 43, an operation portion cam 44, a cam spring 45 and a cover 46. One surface (cam surface) of the operation portion stay 43 has a predetermined shape, and a predetermined surface of the operation portion cam 44 is pressed against the surface of the operation portion stay 43 by the urging force of the cam spring 45 (urging member). By selecting a position of a cam surface (engaged surface) of the operation portion stay 43 to which the operation portion cam 44 is pressed, the operation portion 40 can be selectively and held in steps at a desired predetermined angle. The cover 46 houses the operation portion stay 43, the operation portion cam 44 and the cam spring 45, and is fixed to a later mentioned panel base 47 by screws or the like. The positional configuration of the cam and the stay is not limited to the above mentioned configuration. In other words, any configuration may be used as long as the composing elements on the cam side can be disposed on one of the operation portion 40 and the apparatus main body, and the composing elements on the stay side can be disposed on the other thereof respectively. This means that the composing elements on the cam side may be disposed on the operation portion 40 and the composing elements on the stay side may be disposed in the apparatus main body.

Figure 6B:
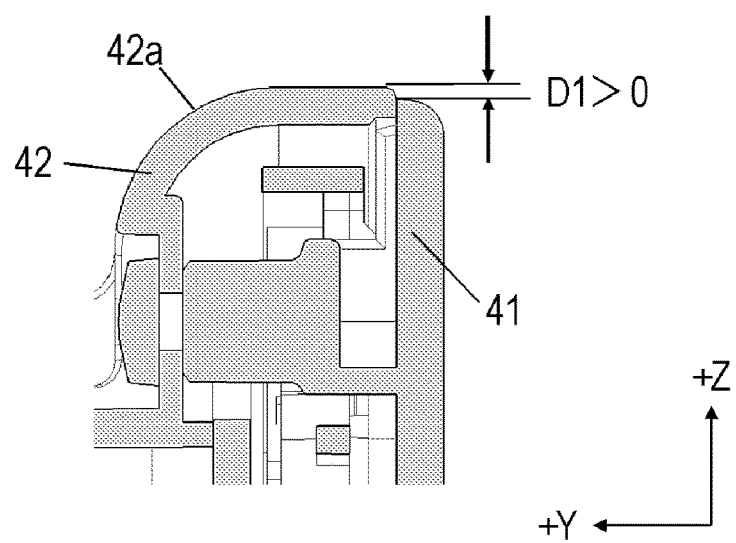

FIG. 6B is a view of the X1-X1 cross-section in FIG. 6A, and indicates a joint portion of the front face casing portion 41 and the rear face casing portion 42. FIG. 6B indicates only the upper portion of the casing portion, but the casing portions are joined in the same manner throughout. As indicated in FIG. 6B, a step D1 is created at the joint portion between the outer periphery of the front face casing portion 41 and the rear face casing portion 42, such that the dimension of D1 is greater than 0. In Embodiment 1, D1 becomes D1>0. In other words, the rear face casing portion 42 always protrudes from the front face casing portion 41 in the +Z direction. In the case of Embodiment 1, D1=0.5 mm. By this configuration, the original document P can be pulled out smoothly as described later, and scratches and the like of the original document P can be reduced.

Operation Portion Rotating Mechanism

Figure 7A:
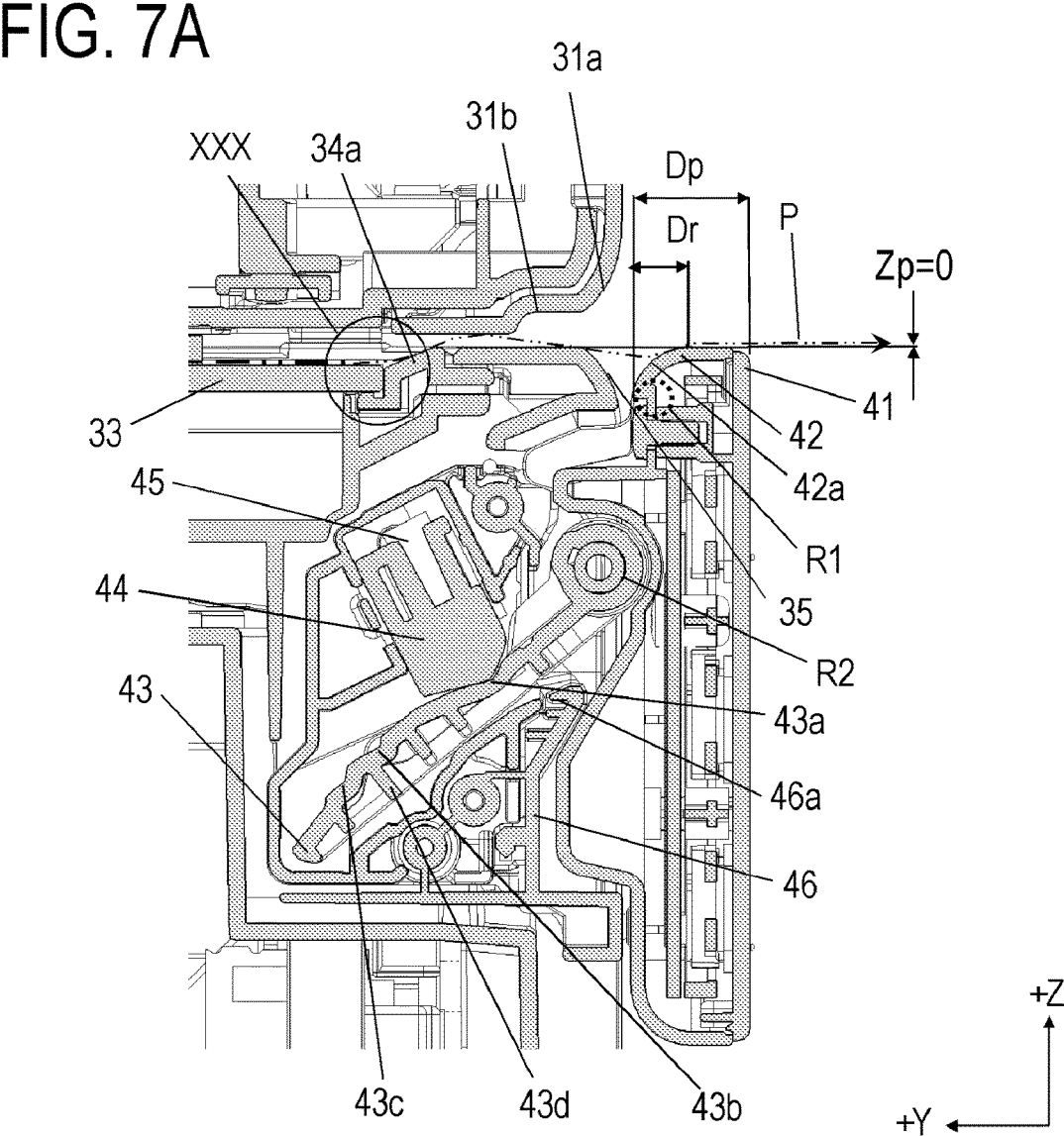
FIGS. 7A and 7B are cross-sectional views of a part of the recording apparatus according to Embodiment 1.
Figure 7B:
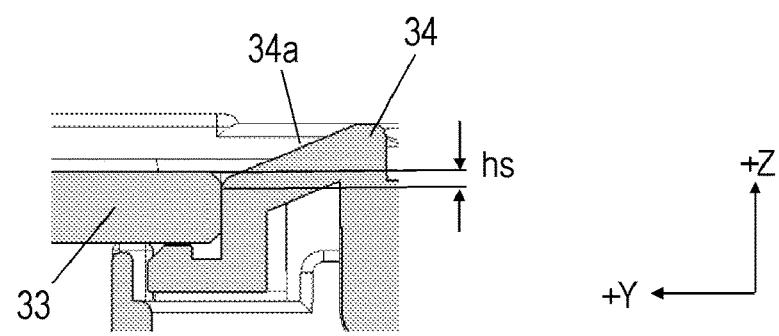

FIG. 7A is a cross-sectional view of a part of the recording apparatus (in the state where the operation panel is closed) in the vicinity of the operation portion 40. FIG. 7B is an enlarged view of an XXX portion. A first cam surface 43a, a second cam surface 43b, and a third cam surface 43c (a plurality of engaged surfaces with which the operation portion cam 44 can be engaged) and a rib 43d as a stopper portion are integrally formed on the operation portion stay 43. By press-contacting the operation portion cam 44 to the cam surfaces, the rotating angle of the operation portion 40 can be changed and held at that position.

FIG. 7A indicates the state where the opening angle of the operation portion 40 is 0° (the state where the operation portion 40 is closed). In this state, the operation portion cam 44 is press-contacted to the first cam surface 43a of the operation portion stay 43, and the height (Zp) of the section between the front cover 35 and the rear face casing portion 42 is 0. The two-dot chain line in FIG. 7A indicates an orientation of an original document to be read in a case where the original document is larger than the front cover 35, and a locus when a standard sized original document is pulled out.

As illustrated in FIG. 7A an R shape 31a and a recessed shape 31b are formed in the lower front face of the original document cover 31. Further, an R shape 42a in the cross-sectional view is formed in the rear face casing portion 42 of the operation portion 40. Here the R shape 42a is about ½ of the thickness (Dp) of the operation portion (Dr≈DP/2). By this configuration, particularly in a state where the operation portion 40 is opened (see FIG. 8), a large space can be created in the passage of the original document P, and even if the orientation of the original document P changes, there are no local components that press-contact the original document P, and scratches and bending of the original document can be prevented.

FIG. 8 is a cross-sectional view of a part of the recording apparatus in a case where the opening angle of the operation portion 40 is 45°. In this case, the positional relationship between the operation portion stay 43 and the operation portion cam 44 is in a state where the operation portion cam 44 is press-contacted to the second cam surface 43b, and the height (Zp) of the section between the front cover 35 and the rear face casing portion 42 is about 5 mm.

FIG. 9 is a cross-sectional view of a part of the recording apparatus in a case where the opening angle of the operation portion 40 is 60°. In this case, the positional relationship between the operation portion stay 43 and the operation portion cam 44 is in a state where the operation portion cam 44 is in press-contacted to the third cam surface 43c, and the height (Zp) of the section between the front cover 35 and the rear face casing portion 42 is about 5.5 mm.

FIG. 10 is a cross-sectional view of a part of the recording apparatus in a case where the rotation of the operation panel is stopped, specifically, a case where the opening angle of the operation portion 40 is 65.5°. In this case, a rib 43d, formed at a position facing the cam surface of the operation portion stay 43, contacts with a hook 46a formed on the cover 46, hence the operation portion 40 no longer rotates (counterclockwise in FIG. 10).

Because of the above configuration, the operation portion 40 can be rotated and held at a desired position by the manual operation of the operator, and even if the operator tries to rotate the operation portion 40 exceeding a predetermined opening angle by mistake, the press-contact state between the cam surface of the operation portion stay 43 and the operation portion cam 44 can be constantly maintained. Therefore the operation portion 40 can be rotated stably.

Figure 13:
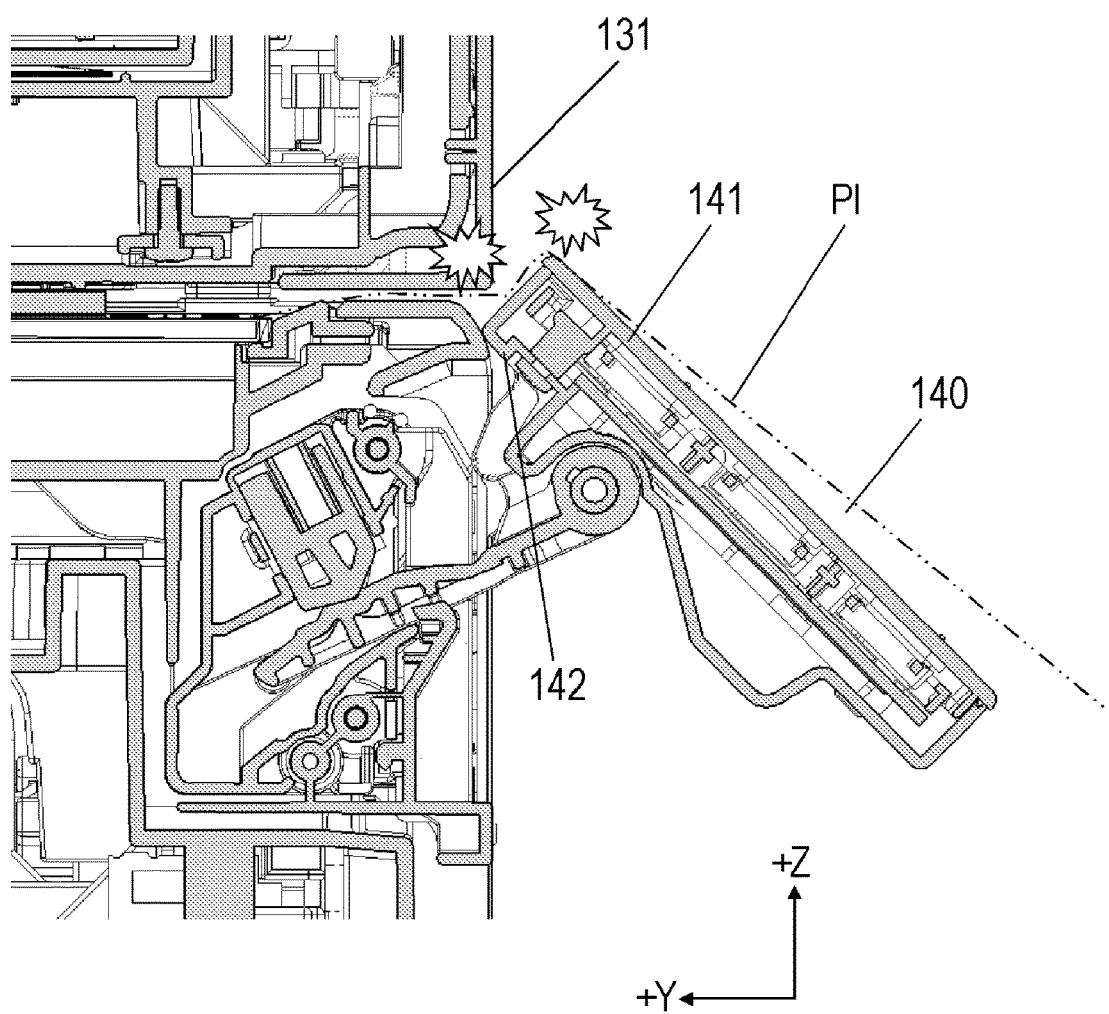
FIG. 13 is a cross-sectional view of a part of a recording apparatus according to a comparative example.

FIG. 13 is a cross-sectional view of an apparatus according to a comparative example, where an operation portion and an original document cover are disposed. The operation portion 140 of the comparative example in FIG. 13 is configured such that a front face casing portion 141 of the operation portion 140 is larger than a rear face casing portion 142 in the +Z direction, as illustrated in FIG. 14B. Compared with FIGS. 7A and 7B, a shape of the rear face side of the rear face casing portion 142 is closer to a right angle. In the case of the configuration of the comparative example in FIG. 13, if the original document turns downward, as illustrated in FIG. 14B, when the original document is pulled out of the reading portion in a state where the operation portion 140 is open, the original document contacts the rear face casing portion 142 almost directly, hence the original document may bend at this section. Even if the original document makes it through this section, the original document may be hooked by the step between the front face casing portion 141 and the rear face casing portion 142, and in this case, it is difficult to pull out the original document. If the operator forcibly pulls the original document out in the hooked state, the original document may bend.

Figure 14A:
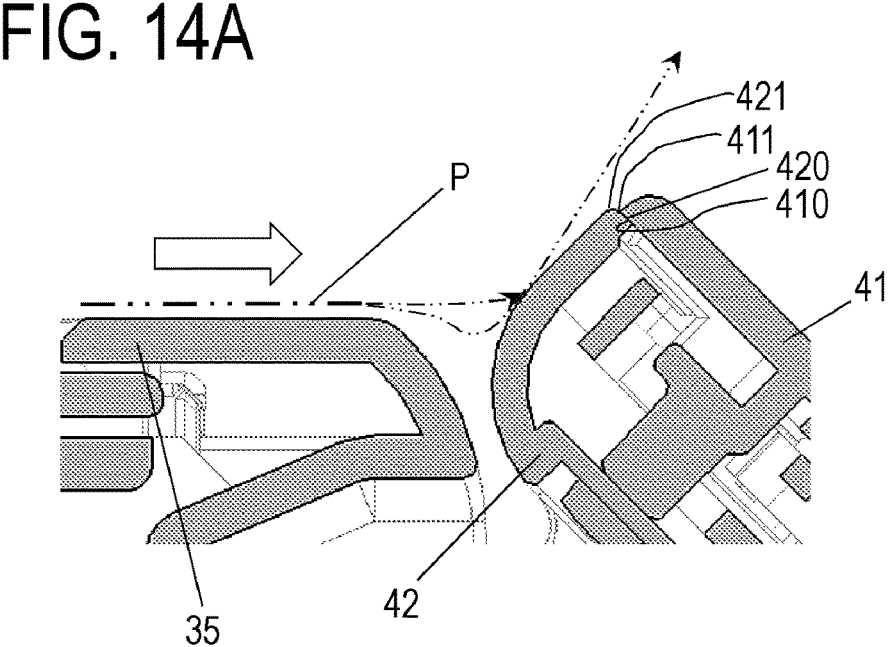
FIGS. 14A and 14B are diagrams depicting an advantage of the recording apparatus according to Embodiment 1.
Figure 14B:
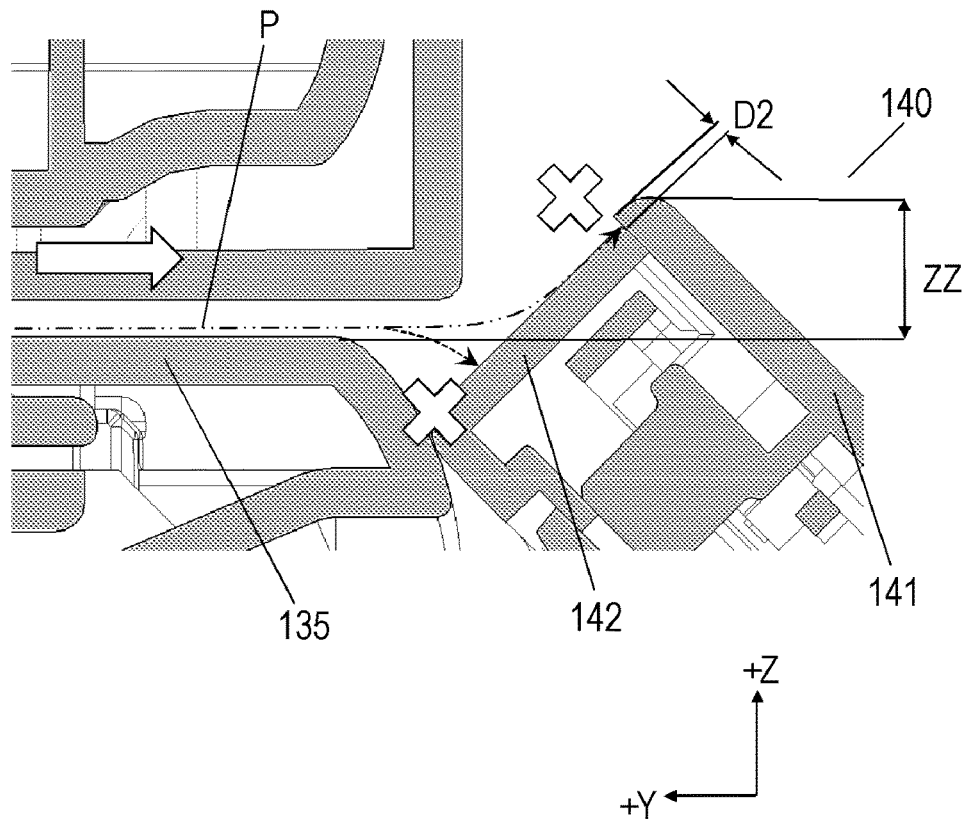

FIG. 14A indicates a state of the original document (locus of removing the original document) when the original document is removed from the recording apparatus of Embodiment 1, illustrated in FIGS. 7A and 7B. Because of the R shape that is formed on the rear face of the rear face casing portion 42, facing the original document plate 32, the original document contacts the rear face casing portion 42 at a wider angle than the case indicated in FIG. 14B. Hence the original document advances in the −Y direction without bending, after contacting the rear face casing portion 42. Further, the rear face casing portion 42 is larger than the front face casing portion 41 in the +Z direction. In other words, at least at an engaging portion of the front face casing portion 41 and the rear face casing portion 42 at the upper end portion of the operation portion 40 (joint portion of an engaging surface 410 of the front face casing portion 41 and an engaging surface 420 of the rear face casing portion 42), an upper edge 411 of the front face casing portion 41 is located at the inner side of the upper edge 421 of the rear face casing portion 42. The phrase "located at the inner side" refers to the event when the direction from the upper end portion of the operation surface of the operation portion 40 to the lower end portion of the operation surface of the operation portion 40 (Z direction if the angle of the operation portion 40 is 0°), the distance from the engaging surface 410 of the front face casing portion 41 to the lower end portion of the operation portion 40 (portion of the operation portion 40 in the most −Z direction side when the angle of the operation portion 40 is 0°) in the joining portion is shorter than the distance from the engaging surface 420 of the rear face casing portion 42 to the lower end portion of the operation portion 40 in the joint portion. The upper edge 411 of the front face casing portion 41 is maintained at a position hidden by the upper end portion of the rear face casing portion 42 from the original document plate 32, regardless the angle of the operation portion 40 from the apparatus main body. In other words, the upper edge 411 of the front face casing portion 41 on the operation surface side is maintained at a position which is more distant from the original document plate 32 than the upper edge 421 of the rear face casing portion 42, regardless the angle of the operation portion 40 from the apparatus main body, and is lower than the upper edge 421 of the rear face casing portion 42. Thereby the original document can be pulled out without being hooked by a step, since there is no step on the path where the original document advances.

Furthermore, in a case of reading an original document that is larger than the original document plate, in a state where the original document cover 131 is almost at a right angle, as illustrated in FIG. 13, the original document P1 may be snagged by the original document cover 131 and the front face casing portion 141 in a sheared state, and may be creased, particularly in a state where the operation portion 140 is open. In the case of the shape according to Embodiment 1 illustrated in FIG. 7, on the other hand, the corner of the original document cover 31 facing the border of the original document plate 32 and the operation portion 40 is recessed in a concave shape, since the R shape 31a and the recessed shape 31b are formed. Thereby the portion of the original document cover 31 pressing the original document is located more in the +Y direction than FIG. 13. As a result, the original document can be prevented from being snagged between the original document cover 31 and the operation portion 40 in the sheared state, and the original document is prevented from bending.

In the recording apparatus 10 of the Embodiment 1, ink tanks are enclosed on both sides of the main body 20, and the openings are disposed so that the operator can see the residual amount of each tank, and the operation portion 40 is attached on the left side of the recording apparatus 10. As described in FIG. 14B, in the recording apparatus of the comparative example, the original document may be scratched by the operation portion 140 (operation panel) when the original document to be read is large, or when the original document is pulled out. To prevent this, the operation portion 140 may be lowered by the amount of the height ZZ of the section between the front cover 135 and the front face casing portion 141. The one-dot chain line in FIG. 12 indicates an example of the disposition of the operation portion 40 in this case. However, if the operation portion 40 is located at the position indicated by the one-dot chain line in FIG. 12, half of the window, to check the residual amount of the ink tank 70, is hidden, therefore the visibility of the residual amount of the ink tank 70 is blocked.

As mentioned above, in the recording apparatus 10 of Embodiment 1, the operation portion 40 can be disposed as high as possible by changing the configuration of the operation portion 40 and the shape of the original document cover 31, so as to ensure visibility of the ink tank. In Embodiment 1, at least ¾ of the window can be seen. It is even more preferable if the window is not hidden by the operation portion 40 (or if ¾ or more of the window is not hidden).

Embodiment 2

Embodiment 2 of the present invention will be described. The contents that are not described here are the same as Embodiment 1.

Figure 11A:
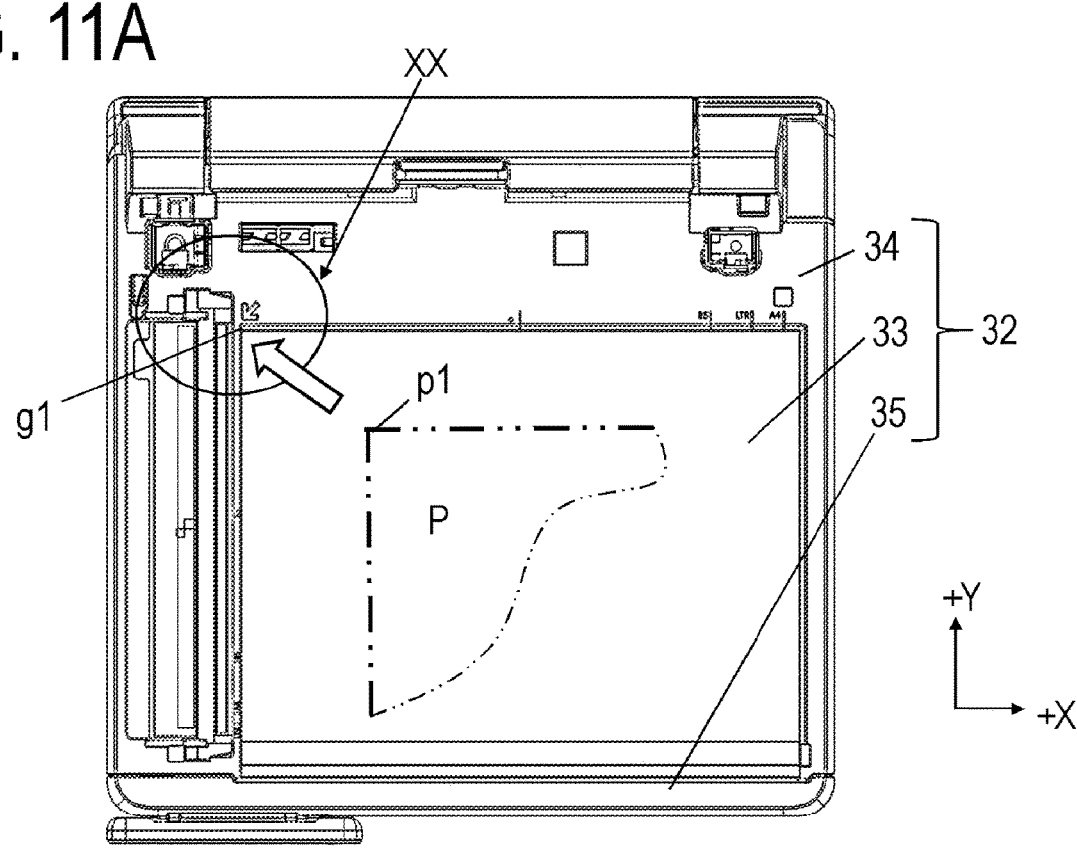
FIGS. 11A and 11B are diagrams depicting an original document plate of a recording apparatus according to Embodiment 2.
Figure 11B:
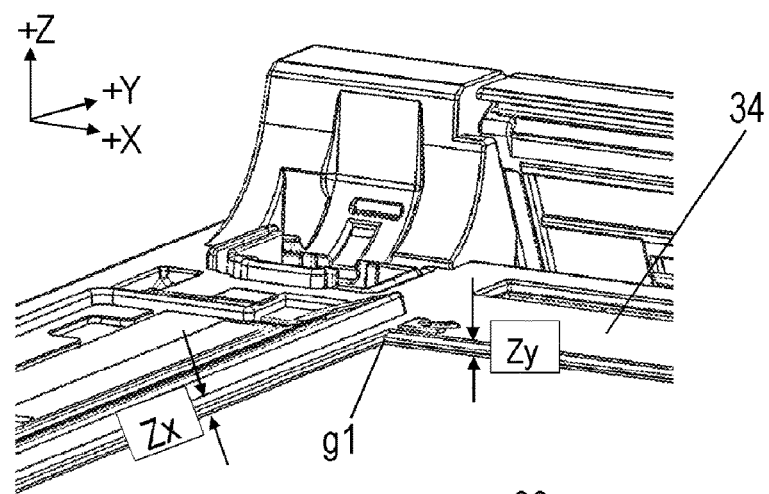

FIG. 11A is a perspective view from the arrow Z in FIG. 4, and is a top view of the original document plate 32 in a state where the original document cover (original document cover portion) 31 is removed. FIG. 11B is an enlarged perspective view of the XX portion in FIG. 11A, and is a diagram for describing the details the original document abutting portion.

The original document plate 32 is constituted of: an outer frame casing portion 34; a transparent member 33 which is fixed to the rear face of the outer frame casing portion 34; and a front cover 35 that is attached to the entire face of the outer frame casing portion 34. In the outer frame casing portion 34, an opening of a predetermined size is formed, and the transparent member 33 is exposed from this opening. Here a range (surface), where the original document P is read, is within the region where the transparent member 33 is exposed. In Embodiment 2, the outer frame casing portion 34 and the front cover 35 are separate components, but the front cover 35 may be integrated with the outer frame casing portion 34.

When the operator reads an original document P, the operator must open the original document cover 31 and place the original document P at a predetermined position. In other words, the operator moves the original document P, which was previously placed on the transparent member 33, in the arrow direction in FIG. 11A, so that a left corner portion p1 of the original document P is abutted with an opening reference point g1 of the outer frame casing portion 34. This operation is called "positioning of the original document P". In Embodiment 2, the reference point of the positing of the original document P is set to the upper left corner, as illustrated in FIG. 11A, but the reference point may be set to any of the four corners of the opening of the outer frame casing portion 34.

In order to set the opening reference point g1 to position the original document P, steps Zx and Zy are formed between the outer frame casing portion 34 and the reading surface of the transparent member 33, as illustrated in FIG. 11B.

When reading of the original document P ends and the original document P is removed from the reading surface of the transparent member 33, the operator must pull out the original document P toward the front side (−Y direction) of the recording apparatus 10.

Conventionally steps are formed approximately vertical from the reading surface of the transparent member 33, hence in some cases, when the operator pulls out the original document P, the edge of the original document P may be hooked by the steps, and the edge of the original document P may be scratched or creased.

Therefore in Embodiment 2, the shape of the step between the outer frame casing portion 34 and the transparent member 33 is formed, as illustrated in FIG. 7B. In other words, on the border portion of the outer frame casing portion 34 with the transparent member 33, the upper face of the outer frame casing portion 34 is formed as a sloping face (inclined surface) 34a, such that the height of the end face of the outer frame casing portion 34 contacting with the transparent member 33 is lower than the top face of the transparent member 33 in a region which overlaps with the direction of removing the original document P placed on the transparent member 33 (region located downstream in the removing direction). The sloping face 34a is formed on the outer frame casing portion 34, so that the start point of the sloping face 34a on the +Y side is lower than the edge of the transparent member 33 (a position lower than the edge by hs in FIG. 7B). The sloping face 34a is formed to be higher from the border portion of the outer frame casing portion 34 with the transparent member 33 toward the downstream in the removing direction.

In the above configuration, no steps, where the original document P could be hooked, exist on the path of the original document P when the operator pulls out the original document P, hence the original document P can be smoothly pulled out. Also the original document P is not scratched, since there is nothing by which the original document P is hooked.

In Embodiment 2, the range where the sloping face 34a is formed is the region alone corresponding to the edge on the front face side out of the four edges of the border portion of the outer frame casing portion 34 with the transparent member 33, but it may also be formed on the right side edge which is not used for forming the reference point g1. In other words, the sloping face 34a may be formed on two edges other than the two edges at which the reference point g1 is formed.

Embodiment 3

Embodiment 3 of the present invention will be described. The contents that are not described here are the same as Embodiments 1 and 2.

As described with reference to FIG. 3B, in the recording apparatus 10, the user can access the interior of the apparatus to solve paper jamming and to perform maintenance (e.g. replenish ink) by opening the reading portion 30. The main body 20 includes the hand grip portion 21 to open the reading portion 30, and the storage medium inserting portion 90 to which an external storage medium 100 (e.g. USB memory) can be inserted (see FIG. 1).

Figure 12:
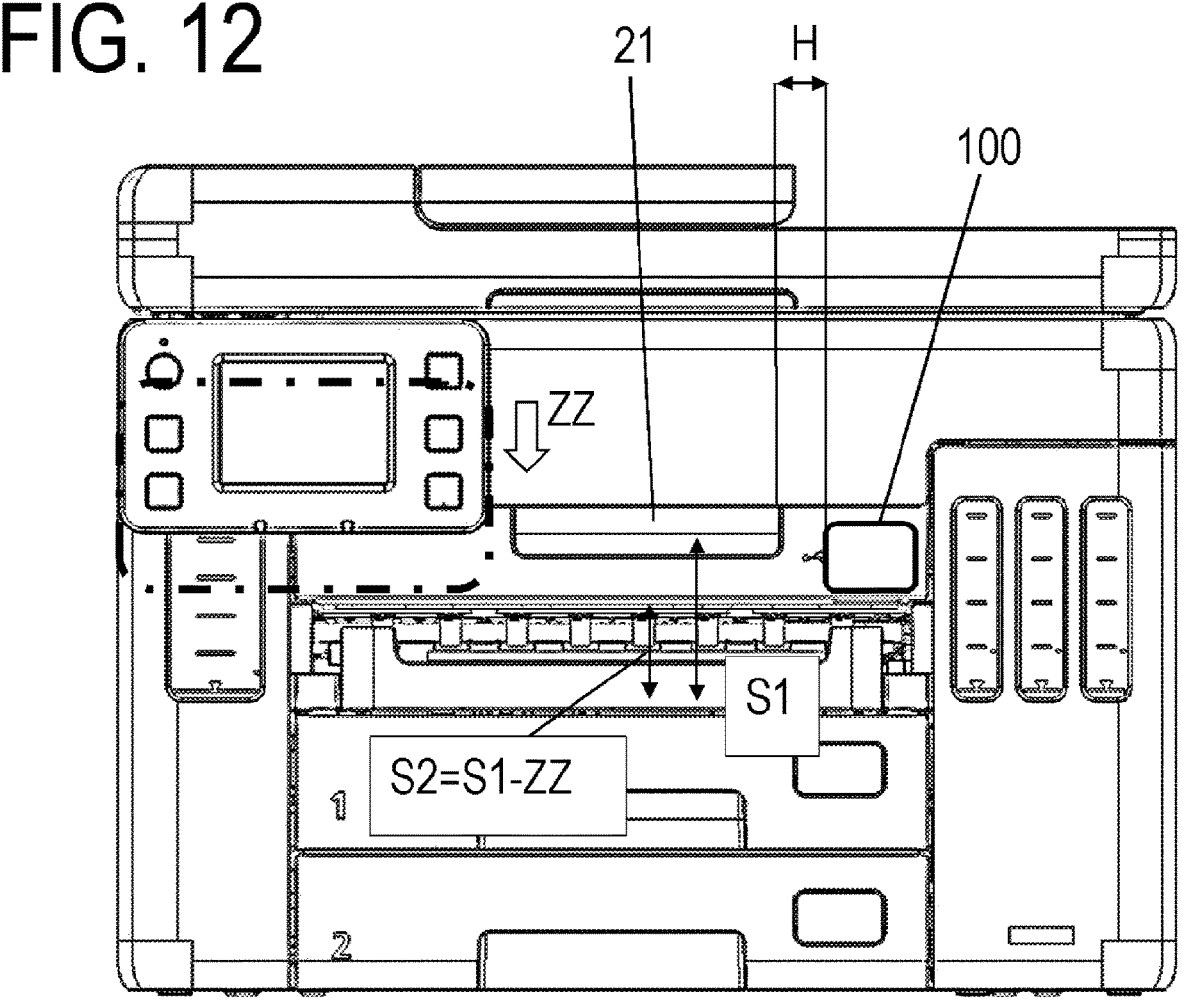
FIG. 12 is a front view of a recording apparatus according to Embodiment 3.

FIG. 12 is a front view of the recording apparatus 10, and indicates a state where the external storage medium (USB memory) 100 is attached to the external storage medium inserting portion 90. In the case where the operation portion 40 is rotated or the original document cover 31 is opened to use the reading portion 30 in a state where the external storage medium 100 is attached to the storage medium inserting portion 90 (state of FIG. 3B), caution is advised to the operator to not strike the external storage medium 100 inserted into the storage medium inserting portion 90 by accident, causing damage to the external storage medium 100. This is why in Embodiment 3, the storage medium inserting portion 90 is disposed so as not to overlap with both the operation portion 40 and the hand grip portion 21 in at least one of the width direction (X direction) and the height direction (Z direction) of the apparatus (see FIGS. 1, 2 and 12). As illustrated in FIG. 2 or FIG. 12, a minimum distance H that is required is maintained between the hand grip portion 21 and the USB memory 100, even in the state of attaching the USB memory 100 to the main body 20, hence the USB memory 100 is not contacted when the operator opens the reading portion 30 or rotates the operation portion 40.

By the configuration described above, the possibility of damaging the external storage medium 100 can be minimized, even if the recording apparatus 10 is operated in the state of the external storage medium 100 being attached.

Embodiment 4

Embodiment 4 of the present invention will be described. The contents that are not described here are the same as Embodiments 1 to 3.

Figure 15A:
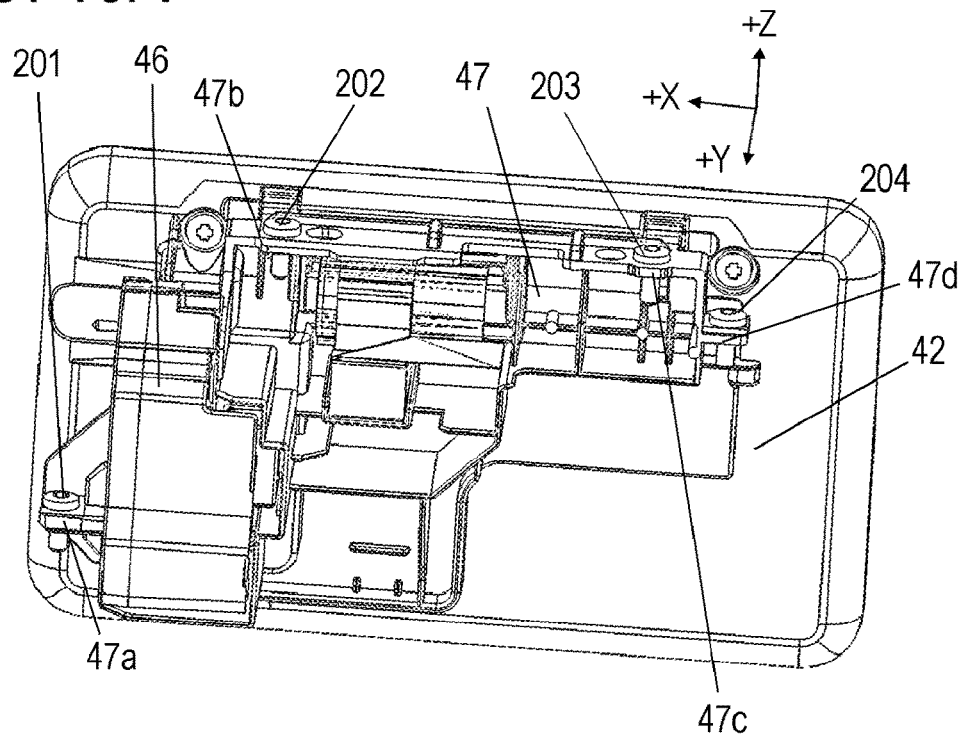
FIGS. 15A and 15B are diagrams depicting an operation portion according to Embodiment 4.

FIG. 15A is a rear perspective view of the operation portion 40. The rear face casing portion 42 is rotatably attached in the panel base 47. Further, the cover 46, which covers the above mentioned panel holding mechanism 48 to adjust the opening angle of the operation portion 40, is attached on the panel base 47. A plurality of fixing shapes 47a to 47d, which are secured to the original document plate 32 by set screws or the like, are formed on the panel base 47.

Figure 15B:
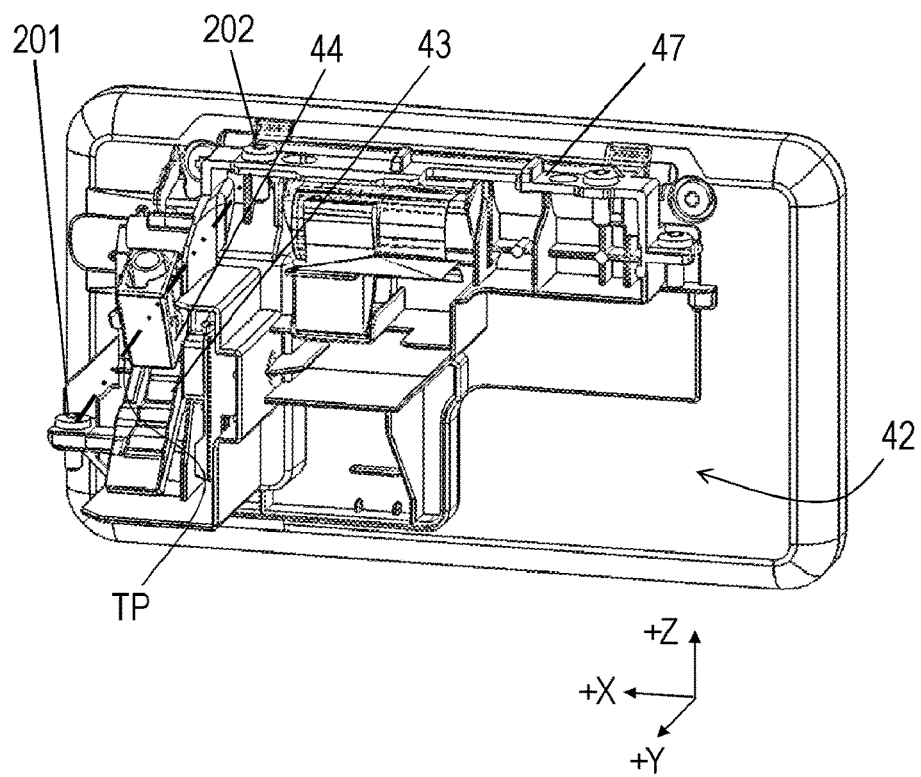

FIG. 15B is a perspective view when the cover 46 in FIG. 15A is removed, and is a diagram for describing the configuration to attach the panel base 47 to a reading base 37, which will be described later.

Figure 17:
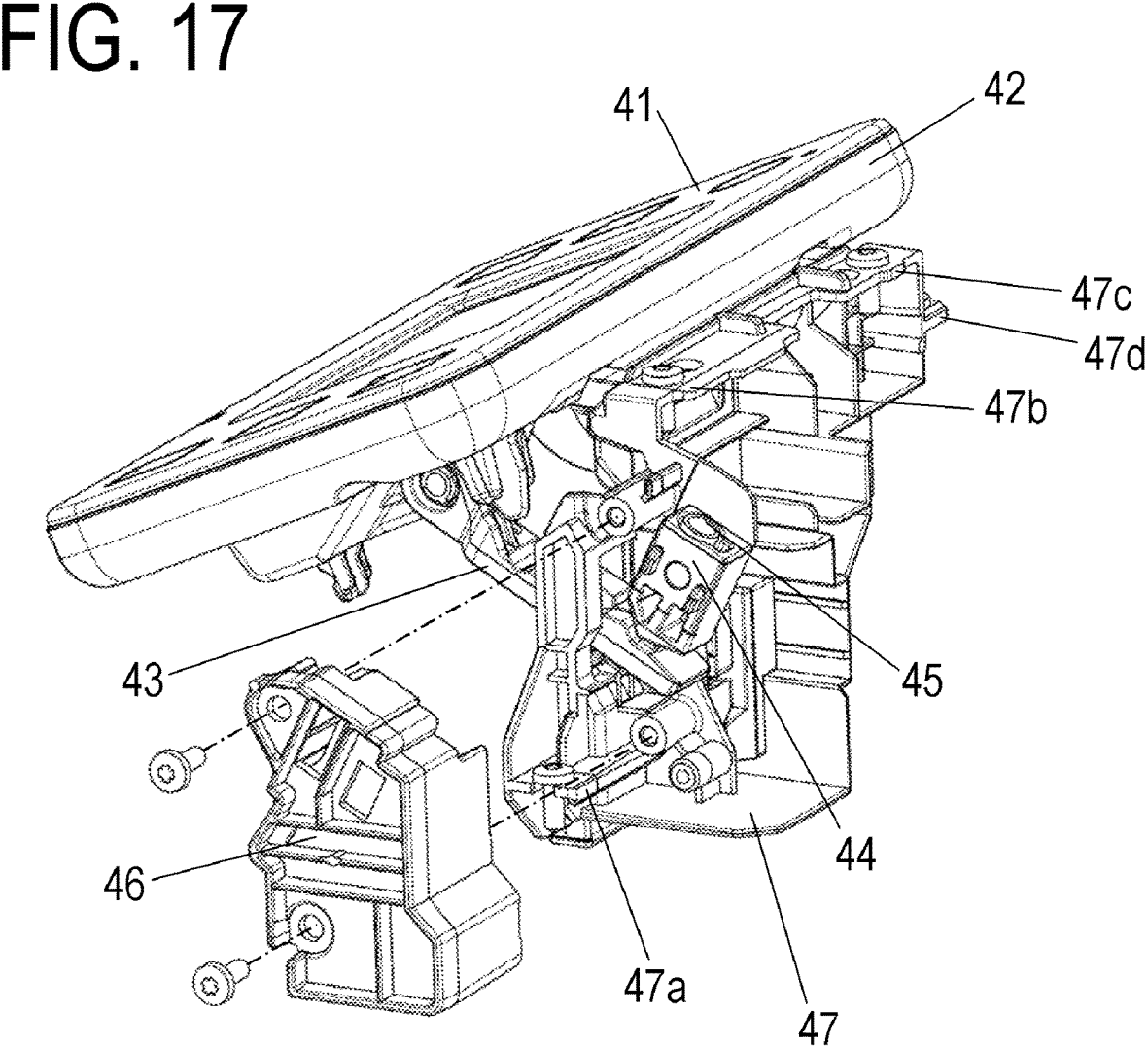
FIG. 17 is a diagram depicting the operation portion according to Embodiment 4.

FIG. 17 is an explosive perspective view of the panel base 47 in a state where the cover 46 is removed from the panel base 47.

The configuration to support the operation portion 40 on the original document plate 32 (main body side) is constituted, such that the panel base 47 serves as the base of the configuration of rotatably supporting the operation portion 40 by the original document plate 32 (main body side), and constitutes the portion for controlling the support angle of the panel holding mechanism 48 on the panel base 47. The fixing shape 47a and the fixing shape 47b are approximately on a diagonal line (Tp), with a portion, where the operation portion cam 44 press-contact the cam surface of the operation portion stay 43, as the center. To this press-contact portion, the operation portion cam 44 is press-contacted to the cam surface of the operation portion stay 43 by a strong restoring force of the cam spring 45 (FIGS. 6A and 6B), hence the vicinity of the press-contact portion may be deformed, or the operation portion 40 may be tilted and the operation portion 40 may not be maintained at a predetermined position. Further, if the operator rotates the operation portion 40, the operation portion 40 may wobble during the rotating operation. However, in Embodiment 4, the fixing means are disposed approximately on the diagonal line (Tp) of the above mentioned press-contact portion where the heaviest load is generated, hence the tilt or wobbling of the operation portion 40 can be prevented.

Figure 16:
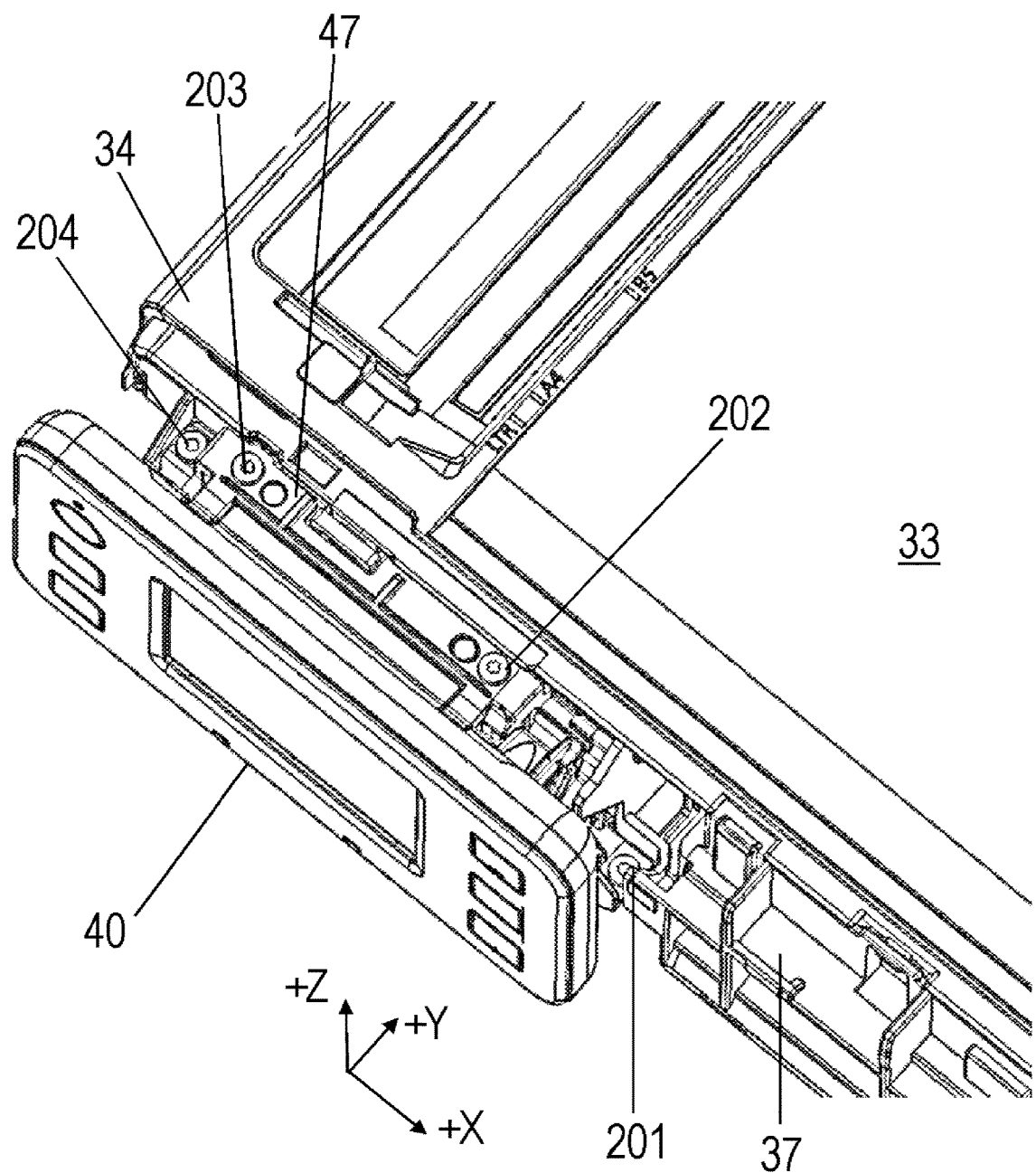
FIG. 16 is a perspective view of a part of an original document plate according to Embodiment 4.

FIG. 16 is a perspective view of a part of the original document plate 32 and indicates a state where the front cover 35 is removed. The panel base 47 is screwed to a predetermined positions formed on the reading base 37 to store the reading portion (not illustrated). In Embodiment 4, the panel base 47 is fixed to the reading base 37 using screws as the fixing means, but the present invention is not limited to this, and a hook-shaped means or a groove-shaped means may be integrally formed on the panel base 47 or the reading base 37, whereby the panel base 47 and the reading base 37 may be fixed.

According to the present invention, the original document P can be more easily removed by a simple and low cost configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-023592, filed on Feb. 17, 2021, which is hereby incorporated by reference herein in its entirety.

What is claimed is:

1. A reading apparatus, comprising:
    a main body that includes an original document plate on which an original document is placed, and a reading portion configured to read an image from the original document placed on the original document plate; and
    an operation portion that is attached in front of the original document plate in the main body,
    wherein the operation portion includes:
    a front face casing portion that is located on an operation surface side; and
    a rear face casing portion that is engaged with the front face casing portion at a rear side of the operation surface, and is supported by the main body,
    wherein an upper end portion of the operation portion is as high as the original document plate or higher than the original document plate,
    wherein in a direction from the upper end portion of the operation portion to a lower end portion of the operation portion, a distance from an upper edge of the front face casing portion to the lower end portion of the operation portion in an engaging portion of the front face casing portion and the rear face casing portion at the upper end portion of the operation portion is shorter than a distance from an upper edge of the rear face casing portion to the lower end portion of the operation portion in the engaging portion of the front face casing portion and the rear face casing portion at the upper end portion of the operation portion,
    wherein the operation panel is rotatable from a state where a top of the operation panel is not above the original document plate to a state where the top of the operation panel is above the original document plate.

2. The reading apparatus according to claim 1,
    wherein in the upper end portion of the operation portion, a surface of the rear face casing portion facing the original document plate is formed to have an R shape in cross-sectional view.

3. The reading apparatus according to claim 1,
    wherein the rear face casing portion is shaft-supported by the main body so as to be rotatable around a rotation axis which extends parallel with the operation surface in an approximate horizontal direction, and
    wherein the operation portion is configured to assume, by rotating with respect to the main body:
    a close posture, where the upper end portion of the operation portion and the lower end portion of the operation portion are vertical and the operation surface faces an approximate horizontal direction; and
    an open posture, where the lower end portion of the operation portion protrudes further toward an upper front side of the reading apparatus than in the close posture and the operation surface is tilted upward.

4. The reading apparatus according to claim 3, further comprising a holding mechanism configured to hold the open posture of the operation portion,
    wherein the holding mechanism includes:
    a cam that is disposed in one of the main body and the operation portion;
    a stay that is disposed in the other of the main body and the operation portion, and includes a plurality of engaged surfaces with which the cam is engageable; and
    an urging member configured to urge the cam to the engaged surfaces, and
    wherein the holding mechanism adjusts an angle of the operation portion in the open posture in steps, by selecting an engaged surface engaged with the cam, out of the plurality of engaged surfaces.

5. The reading apparatus according to claim 3,
    wherein the upper edge of the front face casing portion is maintained at a position hidden from the original document plate in the upper end portion of the rear face casing portion, regardless an angle of the operation portion from the main body.

6. The reading apparatus according to claim 3,
    wherein the upper edge of the front face casing portion is maintained at a position that is more distant from the original document plate than the upper edge of the rear face casing portion and is lower than the upper edge of the rear face casing portion, regardless an angle of the operation portion relative to the main body.

7. The reading apparatus according to claim 1, further comprising an original document cover configured to be openable/closable from an upper face of the original document plate,
    wherein a corner of the original document cover facing a border between the original document plate and the operation portion is recessed in a concave shape.

8. The reading apparatus according to claim 1,
wherein the original document plate includes a transparent member on which an original document is placed, and an outer frame casing portion that supports the transparent member, and
wherein, in a case where the original document placed on the transparent member is removed, a height of a border portion of the outer frame casing portion with the transparent member, which is located at a downstream side of the transparent member in a removing direction, is lower than a top face of the transparent member.

9. The reading apparatus according to claim 8,
wherein the outer frame casing portion has an inclined surface of which height increases from the border portion to downstream in the removing direction, and the highest part of the inclined surface is higher than the top face of the transparent member.

10. The reading apparatus according to claim 1, further comprising:
an original document cover that is configured to be openable/closable from an upper face of the original document plate and is equipped with a hand grip portion to open or close the original document cover; and
an inserting portion that is disposed on a front face of the main body to insert an external recording medium,
wherein the inserting portion is disposed so as to not overlap with the operation portion and the hand grip portion in a width direction of the reading apparatus or a height direction of the reading apparatus.

11. The reading apparatus according to claim 1, further comprising an ink tank configured to store ink,
wherein a window is formed in the reading apparatus so as to view a residual amount in the ink tank,
wherein the operation portion is disposed in front of the window, and
wherein the operation portion and the window are disposed such that ¾ or more the window is not hidden by the operation portion.

12. The reading apparatus according to claim 1, further comprising a recording portion configured to record an image on a recording material,
wherein the recording portion is disposed downward of the reading apparatus.

* * * * *